J. C. SIMS.
COMBINATION CUT-OUT FOR ENGINE IGNITION SYSTEMS.
APPLICATION FILED JAN. 8, 1915.

1,149,001.

Patented Aug. 3, 1915.
2 SHEETS—SHEET 1.

WITNESSES
Frank C. Palmer
C. Bradway

INVENTOR
Jesse C. Sims
BY
ATTORNEYS

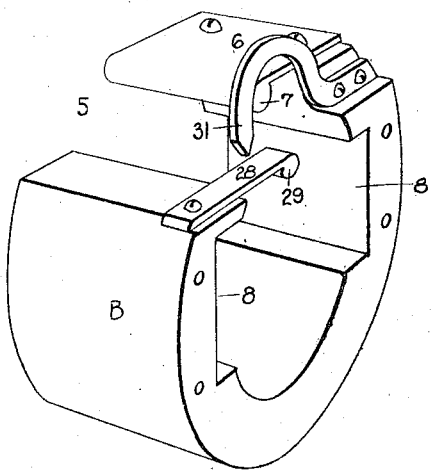
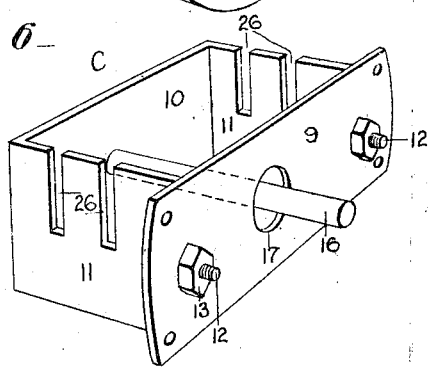
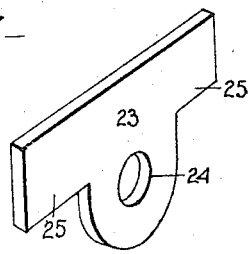

UNITED STATES PATENT OFFICE.

JESSE C. SIMS, OF MAYNARD, MASSACHUSETTS.

COMBINATION CUT-OUT FOR ENGINE IGNITION SYSTEMS.

1,149,001.　　　　Specification of Letters Patent.　　Patented Aug. 3, 1915.

Application filed January 8, 1915. Serial No. 1,206.

*To all whom it may concern:*

Be it known that I, JESSE C. SIMS, a citizen of the United States, and a resident of Maynard, in the county of Middlesex and State of Massachuestts, have invented a new and Improved Combination Cut-Out for Engine Ignition Systems, of which the following is a full, clear, and exact description.

This invention relates to a cutout for the ignition system of automobile engines although it is not limited to this special use, and it relates more particularly to a combination device whereby no person other than the owner or employee can manipulate the cutout when the ignition system is open-circuited, as when the owner or driver leaves his automobile in a public thoroughfare for any purpose, and hence the automobile cannot be stolen or used surreptitiously.

The invention has for its general objects to provide a novel combination cutout switch which is of comparatively simple and inexpensive construction, reliable and efficient in use and so designed as to be readily manipulated.

A further object of the invention is the provision of a combination cutout which includes a plurality of movable contact elements each connected with a number-carrying dial whereby the movable contacts can be brought into a predetermined relationship to effect the closing of the ignition circuit, and such predetermined relationship is maintained as long as the automobile is in use and the owner or attendant is occupying it, but when the owner leaves the car unattended in a public thoroughfare the number dials are shifted so as to open the ignition circuit, and this circuit cannot be again closed until the dials are returned to their former position by a combination of movements which only the owner or an authorized attendant knows.

Still another object of the invention is the provision of a signal or warning circuit-closing device in connection with the cut-out whereby a signal will be energized when any person tampers with the combination device in an attempt to restore the ignition circuit to operative condition and steal the car.

With such objects in view, and others which will appear as the description proceeds, the invention comprises various novel features of construction and arrangement of parts which will be set forth with particularity in the following description and claims appended hereto.

Figure 1:
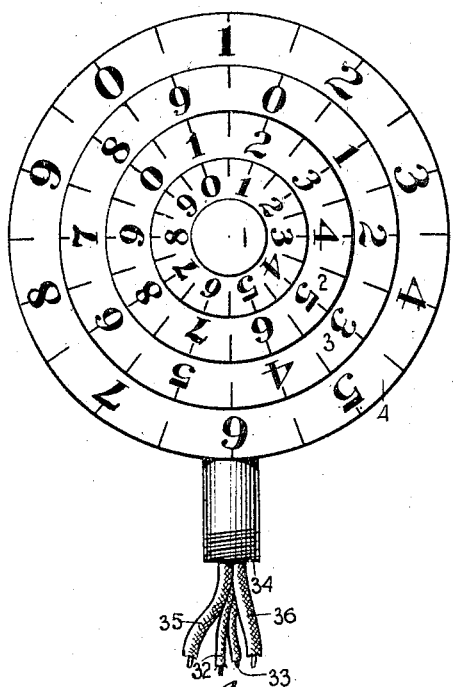
Figure 3:
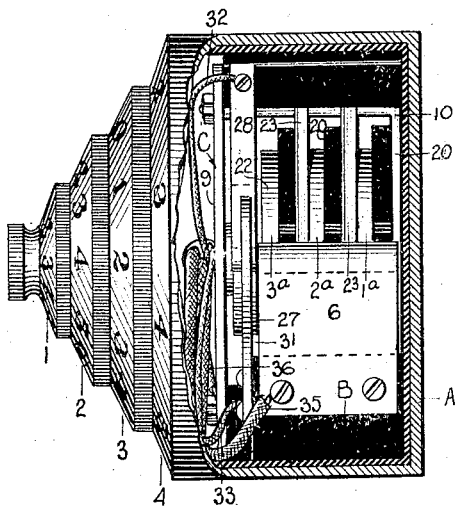
Figure 2:
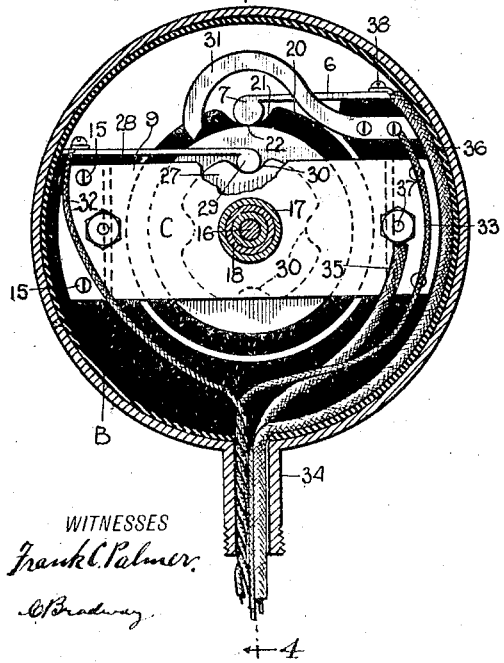
Figure 4:
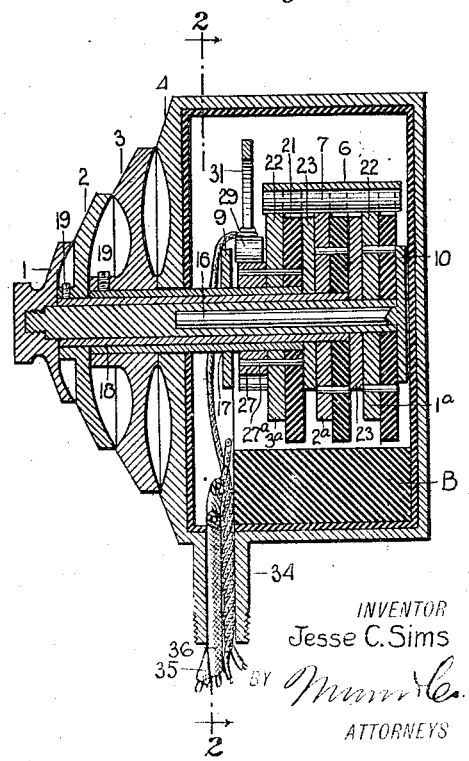

In the accompanying drawings, which illustrate one embodiment of the invention and wherein similar characters of reference indicate corresponding parts in all the views, Figure 1 is a front view of the device; Fig. 2 is a sectional view on the line 2—2, Fig. 4; Fig. 3 is a side view with portions in section to show the interior arrangement; Fig. 4 is a sectional view on the line 4—4, Fig. 2; Fig. 5 is a perspective view of the insulating support that carries the internal mechanism; Fig. 6 is a perspective view of the frame that carries the movable contact wheels; and Fig. 7 is a view of a friction device, one of the friction devices being located between the contact wheels to prevent the turning of two wheels at once.

Referring to the drawing, A designates a casing of suitable construction which has at its front a plurality of number-bearing wheels or dials 1, 2 and 3, nested one within the other and of increasing diameter in the order named, and the front 4 of the casing A bears numbers from zero to 9, as do the dials 1, 2 and 3. These dials are connected with internal mechanism whereby an internal or other circuit may be opened or closed, and any one of a number of combination of numeral groups may be selected to effect a closed circuit position of the internal circuit opening and closing mechanism.

Suitably arranged within the casing A is an approximately circular supporting body B of insulation constructed as shown in Fig. 5. This body is open at one part of its periphery, as at 5, and secured to it at the opening is a spring brush or fixed contact 6 which has its free portion formed into a cam 7 located within the insulation support B. This support has internal oppositely-disposed angular recesses 8 to receive the ends of a rectangular bearing frame C. This frame is made of a base plate 9 and an arched plate 10 having end walls 11 suitably fastened to the base plate 9. The ends 11 of the section 10 may be provided with threaded studs 12 which pass through the plate 9 and have nuts 13 for holding the parts in place. The plate 9 is secured in place on the support B by fastenings 15. On the plate 10 is a stationary centrally disposed shaft or bearing 16 which projects through an opening 17 in the plate 9, such opening 17 being of larger diameter than the bearing 16. Arranged within the frame C are a plurality of contact wheels 1ª, 2ª and 3ª, each having tubular shafts 18 which telescope one within another, and the shaft 18 fastened to the wheel 1ª telescopes over the bearing shaft 16 and the shaft 18 of the wheel 3ª bears in the opening 17 of the frame C. The number wheels 1ª, 2ª and 3ª are connected respectively through the tubular shafts with the dials 1, 2 and 3. The dials may be secured in any suitable manner to the tubular shafts, but preferably an adjustable connection for one or more of the wheels is preferable, so that the combination can be readily changed. Thus the wheels 2 and 3 are secured to their respective shafts by set-screws 19. Each contact wheel has a periphery 20 of insulation which is notched at 21 so as to expose the metal part 22 of the wheel, and into these notches the fixed contact or spring brush 6 is adapted to engage when the notches of all the wheels are in alinement, and when this takes place the ignition circuit is rendered operative, but when the notches are not in alinement the brush 6 will bear on the insulating peripheries of the wheels and the ignition circuit will be cut out of use. Friction elements 23 are disposed between adjacent contact wheels so that one wheel cannot turn accidentally with another one which is deliberately turned. These friction elements are in the form of plates shaped as shown in Fig. 7, each having an opening 24 through which the tubular shafts extend, and also having lugs 25 which are adapted to seat in recesses 26 provided in the upper edges of the walls 11 of the frame C.

It may be desirable to provide a telltale device which will be operative when any unauthorized person attempts to operate the apparatus. For this purpose the notched wheel or cam 27 is fastened to one of the tubular shafts, and bearing on the periphery of this notched wheel is a spring contact 28 fastened to the insulation support B, and when the free cam shaft extremity 29 of the contact 28 is not disposed in a notch 30, the contact 28 will engage a fixed contact 31, also fastened to the insulation support B. These contacts 28 and 31 are connected by wires 32 and 33 with a suitable signal circuit, such wires leading out of an opening 34 in the casing, and through this opening also pass the wires 35 and 36 of the ignition circuit, the wire 35 being grounded on the frame C at 37 and the wire 36 being connected at 38 with the contact 6. It will be observed from Fig. 2 that the contact 28 will engage any one of the notches 30 when the ignition circuit is closed through the device. The cam wheel 27 is secured to one of the contact wheels, and when the latter is turned to open the ignition circuit the turning will stop at a point where the contact 28 will engage any one of the notches 30 so that the telltale circuit will not be kept closed, as would be the case if the contacts 28 rested on the periphery of the cam wheel 27 at a point between notches. In the present instance the cam wheel 27 is shown secured by a fastening means 27ª, Fig. 4, with the first contact wheel 1ª.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A device of the class described comprising a casing, contact wheels mounted therein and having insulating members projecting beyond the periphery thereof, each member having a recess in its periphery, a fixed contact arranged in the casing and adapted to engage with the contact wheels when the said recesses are all in alinement, and means for indicating the positions of the wheels.

2. A device of the class described comprising a casing, contact wheels mounted therein, a fixed contact arranged to close the circuit when the wheels are in a predetermined position, dials outside the casing and connected with the respective contact wheels, and a telltale circuit control means arranged in the casing and including a movable part connected with one of the contact wheels, to effect the closing of the telltale circuit when there is an attempt to move the contact wheels to predetermined circuit closing position.

3. A device of the class described comprising a casing, contact wheels mounted therein and having insulating members projecting beyond the periphery thereof, each member having a recess in its periphery, a fixed contact arranged in the casing and adapted to engage with the contact wheels when the said recesses are all in alinement, means for indicating the positions of the wheels, and a tell-tale circuit controlling means arranged in the casing and including a movable part connected with one of the contact wheels to effect the closing of a tell-tale circuit when there is an attempt to move the contact wheels before predetermined circuit-closing position.

4. An electric cutout device of the class described comprising a casing, a body of insulation mounted therein, a frame secured to the said body, rotary contacts mounted in the frame, a fixed contact fastened to the said body and adapted to engage with the movable contacts when the latter are all in alinement, circuit wires connected with the movable and fixed contacts, number dials connected with the respective movable contacts, a cam wheel connected with one of the movable contacts, a contact actuated by the cam wheel, and a fixed contact with which the last-mentioned contact is adapted to engage for closing a warning circuit.

In testimony whereof I have signed my name to this specification in the presence of two subscribing witnesses.

JESSE C. SIMS.

Witnesses:
  JAMES J. LEDGARD,
  THOMAS COLLINS.